United States Patent Office

Re. 25,953
Reissued Feb. 22, 1966

25,953
PROCESS AND COMPOSITION FOR BRIGHTENING ALUMINUM

Taylor G. King and Harrison R. Tyler, Richmond, Va., assignors to Socony Mobil Oil Company, Inc., a corporation of New York No Drawing. Original No. 3,119,726, dated Jan. 28, 1964, Ser. No. 232,294, Oct. 22, 1962, which is a continuation of Ser. No. 860,730, Dec. 21, 1959. Application for reissue May 5, 1964, Ser. No. 375,687
24 Claims. (Cl. 156—21)

Matter enclosed in heavy brackets [ ] appears in the original patent but forms no part of this reissue specification; matter printed in italics indicates the additions made by reissue.

This invention relates to a process for brightening aluminum and to an improved acid bath composition for use with the process.

It is known to brighten aluminum surfaces by subjecting the aluminum sheet or article to the reaction of an aqueous solution of a mixture of a major amount of phosphoric acid and a minor amount of nitric acid, i.e., by immersing the aluminum into the acid bath at a particular temperature for a period of time sufficient to brighten the surface thereof but insufficient to harmfully attack the metal. Other ingredients such as acetic acid, sulphuric acid, salts of copper and silver, including the nitrates and carbonates thereof, and the like may be added to the bath. These baths, although effective to some extent, do not give the best polish possible.

One of the principal disadvantages of such acid baths is that at the high temperatures necessary to obtain an acceptable polish on the surface of the aluminum, such as from about 190° to 210° F., there is a high consumption of nitric and phosphoric acids, evidenced by, for example, the vigorous fuming of the nitric acid and by a simultaneous reduction in the bath level. Since nitric acid is expensive, the cost of the process utilizing the known acid bath solution is relatively high. Further, the oxides of nitrogen evolved, besides being dangerous to the operators of the process, are highly corrosive and gradually attack the equipment, necessitating repairs or replacements thereof.

Another disadvantage of the known acid baths for polishing aluminum is the decrease in their polishing efficiency caused by the rapid buildup of aluminum salts in the bath at the necessarily high temperatures required for acceptable polishing. Not only does the formation of the aluminum salts in the acid solution result in decreasing the polishing effect on the aluminum surface, but if the buildup of the salts becomes excessive, i.e., when the concentration reaches or exceeds about 30–35 grams per liter, the bath is relatively ineffective for its intended purpose and either must be discarded and replaced or must be subjected to various treatments to recover the phosphoric and nitric acid, both alternatives again adding to the costs of the process.

Still other disadvantages of using known phosphoric-nitric acid baths for polishing and brightening aluminum include the virtual impossibility of obtaining satisfactory brightening at low temperatures, of from 170–180° F., and the excessive drag-out of the bath acids occasioned at all temperatures of operation. Excessive drag-out is due to the tendency of the bath acids to cling to the aluminum surface after the polished article has been removed therefrom.

Accordingly, it is an object of this invention to provide an improved acid bath composition for brightening aluminum which obviates the aforementioned disadvantages of known polishing baths.

It is a further object of this invention to provide an acid bath composition having increased efficiency for polishing aluminum therein at lower temperatures than heretofore possible, which acid bath improves the brightness of the aluminum at high temperatures while reducing the normally high loss of nitric acid, due to drag-out and to evaporation.

It is a further object of this invention to provide a process for brightening aluminum at low temperatures while improving the brightness and thus the specular reflectance of the aluminum surfaces at high temperatures, which process can be more economically performed at lower temperatures without the usual high loss of bath ingredients and with a consequent reduction in the formation of corrosive and hazardous acid fumes.

Still another object of the invention is to provide a process for extending the effective life of the acid bath at all temperatures of operation without reducing the rate of attack on the aluminum surfaces and thus permit the use of the polishing bath even though it contains more than the maximum amount of aluminum salts which heretofore have rendered the bath relatively ineffective for polishing purposes.

In attaining the objects of this invention, one feature resides in modifying the known phosphoric-nitric acid baths by adding thereto an amount, within a relatively small range, of a compound having the formula

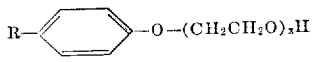

where R is an alkyl radical containing from about 7 to about 9 carbon atoms and x is a positive whole number of from 5 to 9.

Other objects, features, and advantages of the invention will become apparent from the following description of the invention.

It has been found that if a relatively small amount of an ethylene oxide condensation product wherein the hydrophylic group in the molecules consists of a condensation of molecules of ethylene oxide and the hydrophobic portion is a hydrocarbon chain coupled with a cyclic hydrocarbon group is added to the known phosphoric-nitric acid bath, the disadvantages listed above with respect to the known acid baths were obviated. It is preferred to use from about 0.001 to 0.05 percent by weight of a compound having the formula

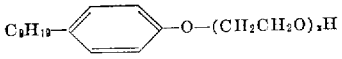

wherein x is a positive whole number from 5 to 9, and preferably when x is a positive whole number from 5 to 7. Excellent results have been obtained when x represents 5 ethoxylated groups.

Most commercially available acid baths for polishing aluminum comprise about 52–94% phosphoric acid, 1–18% nitric acid, and from 5–30% water. Acetic acid or other acid or salt additives may also be present in minor amounts. It has been found that use of these ethoxylated nonylphenols reduces the consumption of nitric acid, increases the life of the acid bath at all temperatures of operation, reduces the drag-out at the higher and lower temperatures, increases the specular reflectance of the aluminum article at the higher temperatures, and gives a better polish at lower temperatures than is obtainable with known acid baths.

While use of additives has been suggested in attempts to overcome some of the disadvantages of the known acid baths for brightening aluminum, their use has not produced encouraging results. Inorganic and organic agents, including the ionic sulphate and sulphonates, have proven ineffective, and many of them have simply decomposed in the acid baths because they were unable to withstand the drastic conditions present in the acid polishing of aluminum. The decompostion was evidenced by a violent evolution of oxides of nitrogen and subsequent blackening of the acid solution. Whether the agent was added to the cold solution and the solution subsequently heated to its operating temperature or whether the solution was heated prior to the addition of the agent was of no consequence —the results were always the same and always negative.

Since the addition of the ethylene oxide condensation products of the invention improve so many qualities of the phosphoric-nitric acid baths, it is believed that their function is more nearly that in the nature of a catalyst, i.e., they function in such a way that they are used up at a rate significantly less than they would be according to any stoichiometric chemical reaction.

For process of the invention, the acid bath containing an ethoxylated nonylphenol is maintained at a temperature within the range of about 170°–200° F. and preferably no higher than that which is necessary to obtain the best polishing results under the particular conditions and acid mixture being used. The aluminum article to be polished is immersed in the bath for the particular time period necessary to achieve a brightness on the surface of the articles, usually in about 1 to about 5 minutes. It has been found that an immersing period of 1–3 minutes will suffice for most polishing requirements. Agitation normally produces a better polish, but in the presence of the additive of the invention, agitation becomes less critical. Brightening of the aluminum article takes place during the period that it is immersed and the increased brightness is measured as an increase in the specular properties of the material.

The following examples will serve to illustrate the invention, but it is to be understood that they are in no way to be construed as limiting the scope of the invention thereto.

EXAMPLE 1

To a basic brightening solution consisting of 94 parts by volume of 85% phospheric acid and 6 parts by volume of concentrated nitric acid, was added from about 0.006% to about 0.03% by weight of ethoxylated nonylphenol containing [5]4 ($-CH_2CH_2O-$) units per molecule either alone or in combination with a small amount, by weight, of copper nitrate, a known ingredient for improving the polishing efficiency of the bath. The aluminum article was brightened by immersing it in the bath at temperatures of from 170°–200° F. and for periods of time ranging from about 1 to 5 minutes. The aluminum used was obtained from commercial sources and had the regular mill finish. Each piece was approximately 1½" wide and 3" long, and the average specular reflectance before treatment was about 25 units. The increase in brightness was measured by the relative specular reflectance, and the actual measuring was done with a Model 510 Photovolt Meter with a 600 m Metal Search Unit attachment.

A comparison of the effect of other agents in combination with the nonylphenol condensates of the invention was made by placing the particular additive or combinations of additives in the unmodified baths and following the same procedure as indicated above. Table I shows the results of the various tests.

Table I

| Type | Percent Additive | Temp., °F. | Immersion Time, Min. | Percent $AlPO_4$ | Specular Reflectance |
|---|---|---|---|---|---|
| A | | 200 | 3 | 8.5 | 62.0 |
| A | 0.006 Ado* | 200 | 1 | 8.5 | 53.1 |
| A | 0.006 Ado | 200 | 2 | 8.5 | 70.0 |
| A | 0.006 Ado | 200 | 3 | 8.5 | 75.9 |
| A | 0.006 Ado | 200 | 5 | 8.5 | 71.0 |
| A | 0.018 Ado | 200 | 3 | 8.5 | 72.9 |
| A | 0.03 Cu | 200 | 3 | 8.5 | 56.1 |
| A | 0.006 Ado; 0.03 Cu | 200 | 3 | 8.5 | 71.5 |
| A | 0.018 Ado; 0.03 Cu | 200 | 3 | 8.5 | 69.9 |
| A | | 180 | 3 | 8.5 | 49.1 |
| A | 0.006 Ado | 180 | 3 | 8.5 | 73.4 |
| A | 0.018 Ado | 180 | 3 | 8.5 | 72.0 |
| A | 0.03 Cu | 180 | 3 | 8.5 | 51.5 |
| A | 0.006 Ado; 0.03 Cu | 180 | 3 | 8.5 | 65.9 |
| A | 0.018 Ado; 0.03 Cu | 180 | 3 | 8.5 | 68.5 |
| A | | 170 | 3 | 8.5 | 46.8 |
| A | 0.006 Ado | 170 | 3 | 8.5 | 66.7 |
| A | 0.012 Ado | 170 | 3 | 8.5 | 57.0 |
| A | 0.018 Ado | 170 | 3 | 8.5 | 60.8 |
| A | 0.03 Ado | 170 | 3 | 8.5 | 58.1 |
| B | | 185 | 3 | 0.0 | 48.5 |
| B | 0.006 Ado | 185 | 3 | 0.0 | 69.7 |
| B | | 185 | 3 | 6.5 | 35.0 |
| B | 0.006 Ado | 185 | 3 | 6.5 | 56.7 |
| C | | 190 | 2 | 8.5 | 33.0 |
| C | 0.006 Ado | 190 | 2 | 8.5 | 66.0 |
| C | 0.018 Ado | 190 | 2 | 8.5 | 63.0 |
| C | 0.01 Cu | 190 | 2 | 8.5 | 35.0 |
| C | 0.006 Ado; 0.01 Cu | 190 | 2 | 8.5 | 65.0 |

*Ado is the ethoxylated nonylphenol having [5]4 ($-CH_2CH_2O-$) groups.
Cu is the concentration of cupric ions obtained by adding copper nitrate to the bath.
Types A, B, and C refer merely to different aluminum materials obtained from commercial sources.

It is apparent from the above table that the best results obtained with the control acid bath (no additive therein) occur at a temperature of 200° F. At lower temperatures the specular reflectance obtained by the control is markedly diminished. The addition of an amount of 0.006% of the ethoxylated nonylphenol gives excellent results at all temperatures within the range of 170° to 200° F., and the maximum increase in specular reflectance is obtained with immersion times of 2 and 3 minutes. In the presence of the 0.03% cupric ion concentration (from copper nitrate) for three minutes at 200° F., the result is comparable to that obtained by polishing the aluminum with 0.006% nonylphenol condensate for one minute.

At 180° F. the additive still had a decided effect on the polishing of the aluminum surface whereas the copper alone actually is no better than the unmodified control baths. As shown in the results at 200° F. and 180° F. for 3 minutes' immersion, the copper in combination with the nonylphenol condensate gives lower specular values than those obtained when using the condensate alone.

Using the additives of the invention results in an increase of the specular reflectance of the polished article at the temperatures shown in Table I, particularly with respect to the results obtained at the relative low temperature of 170° F. It must be noted that the presence of 8.5% $AlPO_4$ in the acid bath is detrimental to a successful polishing operation, and many commercial operations will discard such a bath. Yet good polishing results are obtained when a minute amount of the additive of the invention is placed in a bath containing this large amount of aluminum salt therein.

While the amount of ethoxylated nonylphenol used may be from 0.001% to about 0.05% by weight of the phosphoric-nitric acid bath, the preferred range is from about 0.005% to about 0.02% by weight, particularly when the nonylphenol contains from 5 to 7 ethoxylated groups. There is usually no advantage to be gained in exceeding the upper limit of 0.05% by weight additive, and in certain instances it is actually detrimental to use too great an excess of the ethylene oxide condensate due to the excessive foaming caused by the additives at the higher concentrations.

The increase in the life of the acid polishing baths noted from use of the additives of the invention is not necessarily a function of a decrease in the rate of surface attack on the aluminum. Actually, it is possible to "regenerate" the bath, i.e., it has been found that an acceptable specular value can be obtained by adding the stated amount of ethoxylated nonylphenol additive to a bath which has been rendered unusable by an excess of dissolved aluminum salts. Thus while the wetting agent of the invention can be added to fresh baths, it has been found that by the addition of our wetting agent to a bath which has been rendered impractical for use during normal polishing operations due to the presence of aluminum salts, the bath can again be used for polishing aluminum. The time required to obtain an acceptable specular finish with the "regenerated" bath compares favorably to that necessary when using a fresh solution, and the immersion time is within the stated 1 to 5 minutes.

To measure drag-out, or the amount of acid which adheres to the aluminum, the aluminum article, after it is removed from the acid bath, has the acid on its surface washed into a container, and the acid is titrated with sodium hydroxide. This method of determining the drag-out is used regardless of the operating conditions, and the improved result using the agents of the invention are measurable in terms of the reduced milliequivalents of acid present in the wash water.

Table II outlines the results from drag-out measurements and shows the reduction in the amount of acid lost when as little as 0.006% by weight of the nonylphenol condensate having [5]4 ($—CH_2CH_2O—$) groups of the invention is used. Strips from the same aluminum stock were used so that the surface area of each strip was constant. A strip was immersed as for normal polishing in a bath consisting of 94 parts by volume of 85% phosphoric acid and 6 parts by volume of concentrated nitric acid. The acid was allowed to drain for the times shown, and the strip was washed to remove the remaining acid. The wash water was then titrated with 0.5 N sodium hydroxide.

Table II

| Temperature, ° F. | Drain Time, Seconds | No Ado, meq. acid | Ado (0.006%) meq. acid | Percent Change |
|---|---|---|---|---|
| 180 | 15 | 14.83 | 13.04 | 12.07 |
| 180 | 15 | 14.94 | 12.55 | 16.00 |
| 180 | 15 | 15.22 | 12.93 | 15.05 |
| 180 | 30 | 13.69 | 12.06 | 11.91 |
| 180 | 30 | 14.07 | 12.39 | 11.94 |
| 200 | 15 | 15.22 | 12.17 | 20.04 |
| 200 | 15 | 15.65 | 12.50 | 20.13 |
| 200 | 15 | 15.70 | 13.26 | 15.54 |
| 200 | 15 | 16.03 | 13.31 | 16.97 |
| 200 | 30 | 13.48 | 12.06 | 10.53 |
| 200 | 30 | 13.59 | 12.39 | 8.83 |

*Ado is the ethoxylated nonylphenol having 4 ($—CH_2CH_2O—$) units per molecule.*

As evidenced by Table II, a significant advance over the results obtained in using the unmodified control baths is readily apparent and is unexpected, especially in view of the extremely small amount (0.006%) of ethoxylated nonylphenol having [5]4 ($—CH_2CH_2O—$) groups used. A difference of from about 9 to 20% in the amount of acid lost by drag-out is a marked improvement in the aluminum brightening art. It is significant that whereas best polishing results are achieved with the unmodified acid bath at a temperature of 200° F. (see Table I), it is at this temperature that the greatest amount of acid is lost by drag-out (see Table II).

This application is a continuation of copending application Serial No. 860,730, filed December 21, 1959, now abandoned.

Having described the invention, what is claimed is:

1. In the process for brightening aluminum wherein said aluminum is immersed in a phosphoric acid-nitric acid bath for a predetermined period of time, the step of incorporating in said bath from .001 to 0.05 percent by weight of a compound having the formula

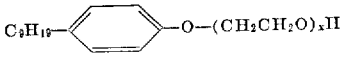

wherein x is a positive whole number from 5 to 9.

[2. In the process for brightening aluminum wherein said aluminum is immersed in a phosphoric acid-nitric acid bath for a predetermined period of time, the step of incorporating in said bath from .001 to 0.05 percent by weight of a compound having the formula

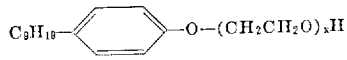

wherein x is a positive whole number from 5 to 7.]

3. In the process for brightening aluminum wherein said aluminum is immersed in a phosphoric acid-nitric acid bath for a predetermined period of time, the step of incorporating in said bath from .001 to 0.05 percent by weight of a compound having the formula

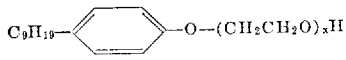

wherein x is 5.

4. In the process for brightening aluminum wherein said aluminum is immersed for a period of from about 1 to 5 minutes and in a phosphoric acid-nitric acid bath maintained at a temperature of from about 170° to about 210° F., the step of incorporating in said bath from .001% to .05% by weight of a compound having the formula

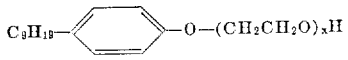

wherein x is a positive whole number from 5 to 9.

5. In the process for brightening aluminum wherein said aluminum is immersed for a period of from about 1 to 5 minutes and in a phosphoric acid-nitric acid bath maintained at a temperature of from about 170° to about 210° F., the step of incorporating in said bath from 0.005% to 0.02% by weight of a compound having the formula

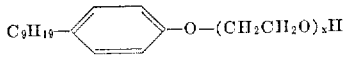

wherein x is a positive whole number from 5 to 7.

6. In the process for brightening aluminum wherein said aluminum is immersed for a period of from about 1 to 5 minutes and in a phosphoric acid-nitric acid bath maintained at a temperature of from about 170° to about 210° F., the step of incorporating in said bath from 0.005% to 0.02% by weight of a compound having the formula

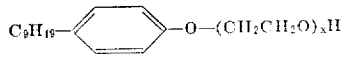

wherein x is 5.

7. In the process for brightening aluminum wherein said aluminum is immersed for a period of from about 2 to 3 minutes and in a phosphoric acid-nitric acid bath maintained at a temperature of from about 170° to about 210° F., the step of incorporating in said bath from 0.005% to 0.02% by weight of a compound having the formula

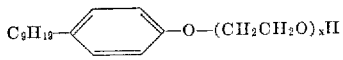

wherein x is 5.

8. In an aluminum polishing bath comprising an aqueous mixture of phosphoric acid and nitric acid, the combination therewith of from .001 to 0.05% by weight of a compound having the formula

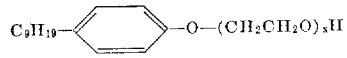

wherein x is a positive whole number from 5 to 9.

9. In an aluminum polishing bath comprising an aqueous mixture of phosphoric acid and nitric acid, the combination therewith of from 0.005% to 0.02% by weight of a compound having the formula

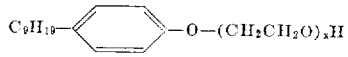

wherein x is a positive whole number from 5 to 7.

10. In an aluminum polishing bath comprising an aqueous mixture of phosphoric acid and nitric acid, the combination therewith of from 0.005% to 0.02% weight of a compound having the formula

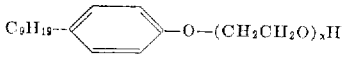

wherein x is 5.

11. An aluminum polishing bath comprising a major proportion of phosphoric acid, a minor proportion of nitric acid, and from about 0.001 to 0.05% of a compound having the formula

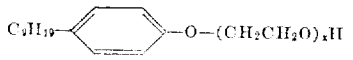

wherein x is a positive whole number from 5 to 9.

12. The aluminum polishing bath as defined in claim 11 wherein x in said formula is an integer of from 5 to 7, and said compound is present in an amount of from 0.005% to 0.02%.

[13. The aluminum polishing bath as defined in claim 11 wherein x is 5, and said compound is present in an amount of from 0.005% to 0.02%.]

14. The process for regenerating a phosphoric acid-nitric acid polishing bath for aluminum rendered ineffective by the presence therein of an excessive amount of aluminum salts formed from previous polishing of aluminum therein, comprising the step of incorporating in said bath from .001 to .05% by weight of a compound having the formula

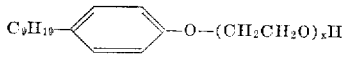

wherein x is a positive whole number from 5 to 9.

[15. The process for regenerating a phosphoric acid-nitric acid polishing bath for aluminum rendered ineffective by the presence therein of an excessive amount of aluminum salts formed from previous polishing of aluminum therein, comprising the step of incorporating in said bath from .001 to .05% by weight of a compound having the formula

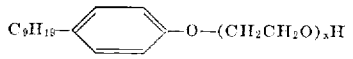

wherein x is a positive whole number from 5 to 7.]

16. The process for regenerating a phosphoric acid-nitric acid polishing bath for aluminum rendered ineffective by the presence therein of an excessive amount of aluminum salts formed from previous polishing of aluminum therein, comprising the step of incorporating in said bath from .001 to .05% by weight of a compound having the formula

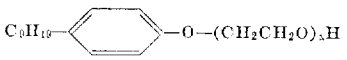

wherein x is 5.

17. In the process for brightening aluminum wherein said aluminum is immersed in a phosphoric acid-nitric acid both for a predetermined period of time, the step of incorporating in said bath from .001 to 0.05% by weight of a compound having the formula

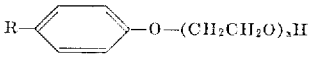

wherein R is an alkyl radical having from 7 to 9 carbon atoms and x is a positive whole number from 5 to 9.

18. In an aluminum polishing bath comprising an aqueous mixture of phosphoric acid and nitric acid, the combination therewith of from .001 to 0.05% by weight of a compound having the formula

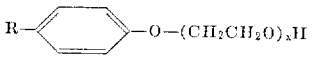

wherein R is an alkyl radical having from 7 to 9 carbon atoms and x is a positive whole number from 5 to 9.

19. The process for regenerating a phosphoric acid-nitric acid polishing bath for aluminum rendered ineffective by the presence therein of an excessive amount of aluminum salts formed from previous polishing of aluminum therein, comprising the step of incorporating in said bath from .001 to .05% by weight of a compound having the formula

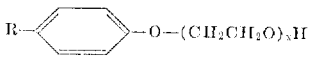

wherein R is an alkyl radical having from 7 to 9 carbon atoms and x is a positive whole number from 5 to 9.

20. In the process for brightening aluminum wherein said aluminum is immersed in a phosphoric acid-nitric acid bath for a predetermined period of time, the step of incorporating in said bath a sufficient amount by weight of a compound having the formula

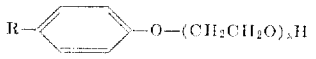

wherein R is an alkyl radical having from 7 to 9 carbon atoms and x is a positive whole number from 5 to 9, to improve the brightness of the aluminum.

21. The process for regenerating a phosphoric acid-nitric acid polishing bath for aluminum rendered ineffective by the presence therein of an excessive amount of aluminum salts formed from previous polishing of aluminum therein, comprising the step of incorporating in said bath a sufficient amount by weight of a compound having the formula

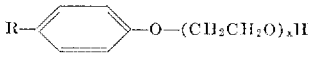

wherein R is an alkyl radical having from 7 to 9 carbon atoms and x is a positive whole number from 5 to 9, to render said polishing bath effective for further polishing of aluminum therein.

*22. In the process for brightening aluminum wherein said aluminum is immersed in a phosphoric acid-nitric acid bath for a predetermined period of time, the step of incorporating in said bath a sufficient amount by weight of a compound having the formula*

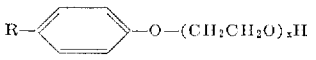

*wherein R is an alkyl group having from 7 to 9 carbon atoms and x is a positive whole number from 4 to 9, to improve the brightness of the aluminum.*

*23. An aluminum polishing bath comprising a major proportion of phosphoric acid, a minor proportion of nitric acid, and from about 0.001 to 0.05% of a compound having the formula*

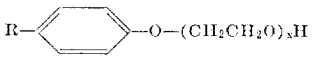

*wherein R is an alkyl group having from 7 to 9 carbon atoms and x is a positive whole number from 4 to 9.*

*24. The process for regenerating a phosphoric acid-nitric acid polishing bath for aluminum rendered ineffective by the presence therein of an excessive amount of aluminum salts formed from previous polishing of aluminum therein, comprising the step of incorporating in said bath a sufficient amount by weight of a compound having the formula*

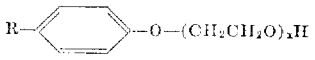

*wherein R is an alkyl group having from 7 to 9 carbon atoms and x is a positive whole number from 4 to 9 to*

*render said bath effective for further polishing of aluminum therein.*

*25. In the process for brightening aluminum wherein said aluminum is immersed in a phosphoric acid-nitric acid bath for a predetermined period of time, the step of incorporating in said bath a sufficient amount by weight of a compound having the formula*

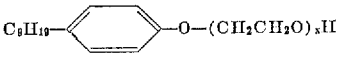

*wherein x is 4 to improve the brightness of the aluminum.*

*26. An aluminum polishing bath comprising a major proportion of phosphoric acid, a minor proportion of nitric acid, and a sufficient amount of a compound having the formula*

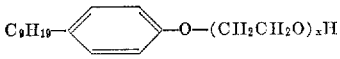

*wherein x is 4, to improve the brightness of aluminum polished in said bath.*

*27. The process for regenerating a phosphoric acid-nitric acid polishing bath for aluminum rendered ineffective by the presence therein of an excessive amount of aluminum salts formed from previous polishing of aluminum therein, comprising the step of incorporating in said bath a sufficient amount by weight of a compound having the formula*

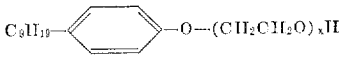

*wherein x is 4, to render said bath effective for further polishing of aluminum therein.*

References Cited by the Examiner

The following references, cited by the Examiner, are of record in the patented file of this patent or the original patent.

UNITED STATES PATENTS

| | | | |
|---|---|---|---|
| 1,970,578 | 8/1934 | Schoeller et al. | |
| 2,213,477 | 9/1940 | Steindorf et al. | |
| 2,461,228 | 2/1949 | Miles | 252—136 |
| 2,629,696 | 2/1953 | Dodd et al. | 252—136 |
| 2,977,315 | 3/1961 | Scheib et al. | 252—136 X |
| 3,072,515 | 1/1963 | Smolinski et al. | 156—20 |
| 3,094,489 | 6/1963 | Barnes | 156—21 XR |

ALEXANDER WYMAN, *Primary Examiner.*

EARL M. BERGERT, J. STEINBERG,
*Assistant Examiners.*